United States Patent [19]
Redford

[11] Patent Number: 6,052,703
[45] Date of Patent: Apr. 18, 2000

[54] METHOD AND APPARATUS FOR DETERMINING DISCRETE COSINE TRANSFORMS USING MATRIX MULTIPLICATION AND MODIFIED BOOTH ENCODING

[75] Inventor: John Redford, Cambridge, Mass.

[73] Assignee: Oak Technology, Inc., Sunnyvale, Calif.

[21] Appl. No.: 09/076,521

[22] Filed: May 12, 1998

[51] Int. Cl.[7] .................................................. G06F 17/14
[52] U.S. Cl. .......................................................... 708/402
[58] Field of Search ................................... 708/402, 628, 708/629, 630, 631, 632

[56] References Cited

U.S. PATENT DOCUMENTS

| | | | |
|---|---|---|---|
| 4,755,962 | 7/1988 | Mor | 364/760 |
| 5,218,565 | 6/1993 | Mou et al. | 364/750.5 |
| 5,748,514 | 5/1998 | Okada et al. | 708/402 |
| 5,831,881 | 11/1998 | Fiedrich et al. | 708/402 |
| 5,999,958 | 12/1999 | Chen et al. | 708/402 |

FOREIGN PATENT DOCUMENTS 60-254372  12/1985  Japan .

OTHER PUBLICATIONS

"Selective Prenormalization of Operands in Floating Point Processors," *IBM Technical Disclosure Bulletin,* vol. 36, No. 12, pp. 693–696.

Mou, Z. et al. "A high–speed low–cost DCT architecture for HDTV applications," *ICASSP 91. 1991 International Conference on Acoustics, Speech and Signal Processing,* (Cat. No. 91CH2977–7), Toronto, Ont., Canada, May 14–17, 1991, pp. 1153–1156.

Stearns, C. "Real Time Multiplication and Division for VLSI DSP," *Proceedings of the Asilomar Conference on Signals, Systems and Computers,* Pacific Grove, Oct. 31–Nov. 2, 1988, vol. 1 & 2, Conf. 22, pp. 919–923.

*Primary Examiner*—David H. Malzahn
*Attorney, Agent, or Firm*—Testa Hurwitz & Thibeault, LLP

[57] ABSTRACT

A method and apparatus for performing matrix multiplication used in image processing is described. A modified Booth encoding method is used to reduce the logic circuitry in processor modules used for calculating forward and inverse discrete cosine transforms. A set of products of image values and matrix coefficients are generated and provided to a set of multiplexers. The multiplexers provide preselected products to a set of accumulators. The accumulators combine the products to generate the set of transform coefficients at the accumulator outputs.

16 Claims, 4 Drawing Sheets

| MATRIX COEFF. | VALUE | *2^13 | BINARY | PRE-MULTIPLIER | NO. BITS TO SHIFT LEFT | PRE-MULTIPLIER | NO. BITS TO SHIFT LEFT | PRE-MULTIPLIER | NO. BITS TO SHIFT LEFT | PRE-MULTIPLIER | NO. BITS TO SHIFT LEFT |
|---|---|---|---|---|---|---|---|---|---|---|---|
| C0 | 0.35355 | 2896 | 101101010000 | 1 | 11 | 7 | 7 | -3 | 4 | 0 | 0 |
| C1 | 0.49039 | 4017 | 111110110001 | 1 | 12 | -3 | 5 | 1 | 4 | 1 | 0 |
| C2 | 0.46194 | 3784 | 111011001000 | 7 | 9 | 3 | 6 | 1 | 3 | 0 | 0 |
| C3 | 0.41573 | 3406 | 110101001110 | 7 | 9 | -3 | 6 | 3 | 1 | 0 | 0 |
| C4 | 0.27779 | 2276 | 100011100100 | 1 | 11 | 7 | 5 | 1 | 2 | 0 | 0 |
| C5 | 0.19134 | 1567 | 011000011111 | 3 | 9 | 7 | 2 | 3 | 0 | 0 | 0 |
| C6 | 0.09755 | 799 | 001100011111 | 3 | 8 | 7 | 2 | 3 | 0 | 0 | 0 |

FIG. 2

METHOD AND APPARATUS FOR DETERMINING DISCRETE COSINE TRANSFORMS USING MATRIX MULTIPLICATION AND MODIFIED BOOTH ENCODING

FIELD OF THE INVENTION

The invention relates generally to a method and apparatus for performing matrix multiplication. In particular, the invention relates to a method using Booth encoding for determining the discrete cosine transform of an image block with decreased logic circuitry.

BACKGROUND OF THE INVENTION

Image compression techniques reduce the memory required for storage of large or complex images, permitting storage of images in devices with limited memory. For example, image compression techniques used in digital copiers and scanners aid in storage of complex images for subsequent printing. Similarly, image compression benefits communications where bandwidth limitations would otherwise render transmission of image data impractical. Image compression also offers substantial benefits for archiving large image libraries.

The JPEG (Joint Photographic Experts Group) standard is a set of image compression techniques that have gained widespread acceptance. The most popular of the three general compression methods defined by the JPEG standard is the baseline sequential discrete cosine transform (DCT) technique. This technique involves a mathematical operation that changes image data into a frequency representation. The results of the DCT operation can be used to reduce the file size of grayscale and color images with a near minimum possible loss of image quality. The basic image unit for JPEG compression is the image block which includes an eight pixel by eight pixel subset of the image. Each image block is analyzed and quantized, yielding DCT coefficients representative of the image block content. The coefficients are then Huffman coded to reduce the amount of data used to characterize them.

Calculation of the forward DCT (FDCT) typically includes multiplying a set of image values by a matrix of coefficients. Calculation of the inverse DCT (IDCT) uses the transpose of the FDCT matrix. These operations exploit symmetries in the matrix coefficients to reduce the number of multiplications and additions and are often referred to as fast DCTs. Unfortunately, the methods for implementing FDCTs and IDCTs are not the same. Significant additional logic is added to make the transform operate in both forward and inverse modes.

SUMMARY OF THE INVENTION

The present invention features a method of image processing using a modified Booth encoding technique to determine an FDCT or an IDCT from a set of coefficients. The method has applications in processing image data according to various standards, including JPEG and MPEG standards. Each image value is multiplied by each coefficient to yield a set of products. Preselected products are combined using similar logic to yield the FDCT or IDCT values. The method results in a substantial reduction in the amount of logic needed for the matrix multiplication.

The method includes the steps of providing a first set of constants, a second set of constants, a set of accumulators, and a set of image values (e.g., grayscale values) for processing. The first set of constants and the second set of constants can be binary numbers. The image values can represent spatial frequency information in an image. The set of image values can represent a subimage of a larger image.

The method also includes the step of multiplying each image value by each constant within the first set of constants to generate a set of partial products. A set of products, which includes the product of each image value with each constant within the second set of constants, is calculated by bit shifting and then adding preselected partial products. The steps of generating the set of partial products, and shifting and adding the partial products can include a Booth encoding technique. In one embodiment, a modified four-bit Booth encoding technique (e.g., the first set of constants are 1, 3 and 7) is implemented.

In another step, each accumulator receives a preselected product from the set of products for each image value. The method includes the step of generating an output at each accumulator based upon the combination of products within the accumulator. In one embodiment, the generated output is the FDCT of the set of image values. In another embodiment, the generated output is the IDCT of the set of image values.

In another aspect, the invention features an apparatus for digital image processing which can determine both FDCTs and IDCTs. The apparatus includes an input for receiving a set of image values (e.g., grayscale values), a first multiplier module, a second multiplier module, a set of multiplexers, and a set of accumulators. The image values can represent spatial frequency information in the image. The set of image values can represent a subimage of a larger image.

The first multiplier module multiplies the image value at the input by each number within a first set of constants. The first multiplier module includes a set of outputs. Each of the outputs provides the product of an image value and a number in a second set of constants. The second multiplier module multiplies the image value by each number within a second set of constants. The second multiplier module includes a set of outputs, each of which provides the product of an image value and a number in the second set of constants. In one embodiment, the second multiplier module performs its multiplication based on a binary shift and combine operation using the products provided at the outputs of the first multiplier module.

The multiplexers communicate with the outputs of the second multiplier modules. Each multiplexer includes an output for providing a preselected product from one of the outputs of the second multiplier module. The accumulators communicate with the multiplexers. Each accumulator includes an output for providing a combination of the products received by the accumulator. In one embodiment, the accumulator output provides the FDCT of the set of image values. In another embodiment, the accumulator output provides the IDCT of the set of image values.

BRIEF DESCRIPTION OF THE DRAWINGS

The foregoing and other objects, features and advantages of the invention will become apparent from the following more particular description of preferred embodiments of the invention, as illustrated in the accompanying drawings. The drawings are not necessarily to scale, emphasis instead being placed on illustrating the principles of the present invention.

FIG. 2 is a table indicating bit shifting and additions in a modified four-bit Booth encoding technique using only four partial products according to the present invention.

DETAILED DESCRIPTION OF THE INVENTION

Figure 1:
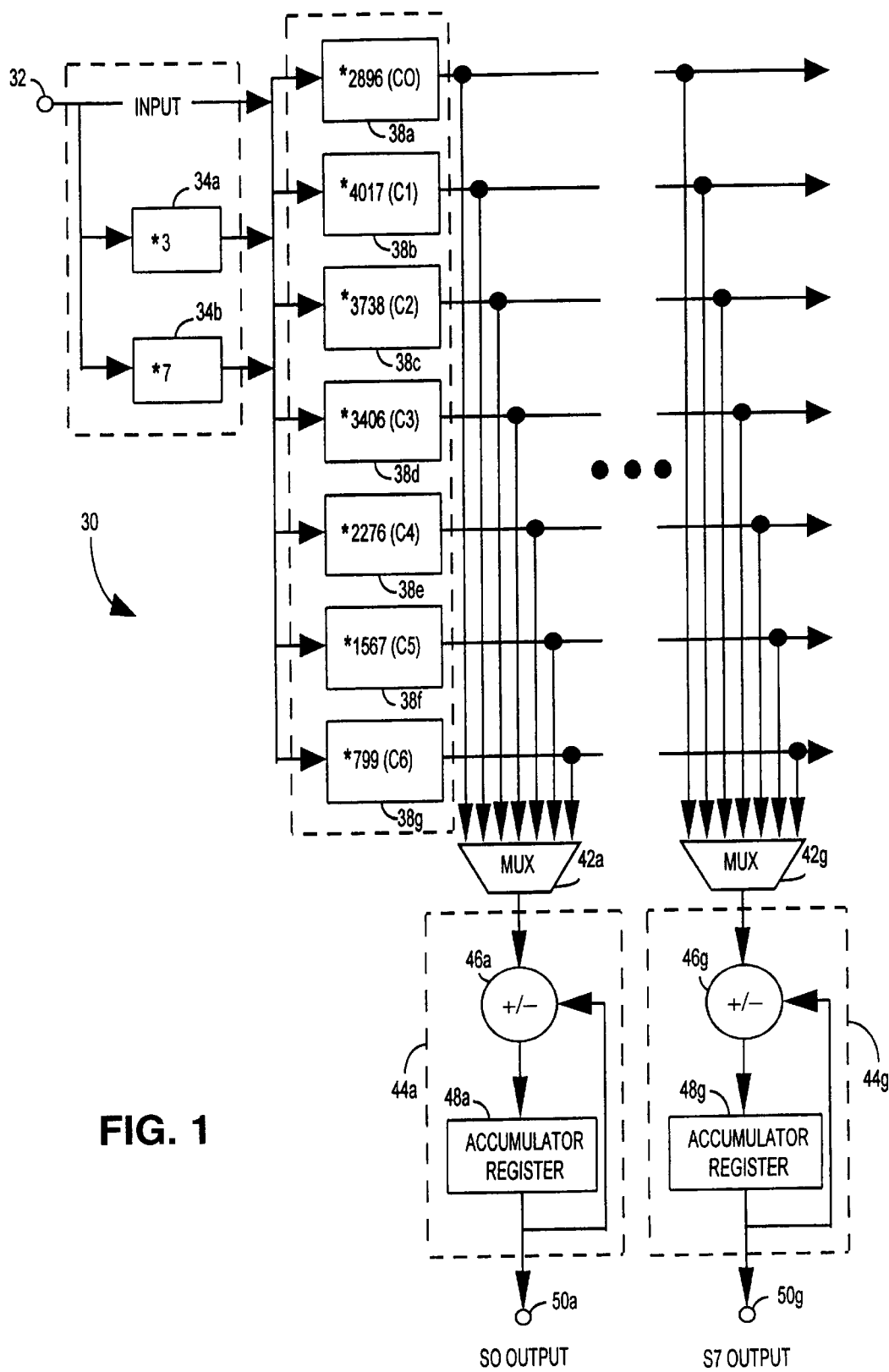
FIG 1 is a functional block diagram of an apparatus for determining the forward DCT and inverse DCT for a set of eight image values according to the present invention.

A one-dimensional FDCT of eight image values is calculated according to:

$$S_i = \frac{C(i)}{2} * \sum_{j=0}^{7} s_j * \cos\left((2j+1)*i*\frac{\pi}{16}\right); \quad (1)$$

where i and j are integers between zero and seven, $s_j$ is one of the eight image values, $S_i$ is one of the eight corresponding frequency components, $$C(i) = \frac{1}{\sqrt{2}}$$

for i=0, and C(i)=1 for i=1 to 7. The FDCT can be expressed in matrix multiplication form as:

$$\begin{bmatrix} S_0 \\ S_1 \\ S_2 \\ S_3 \\ S_4 \\ S_5 \\ S_6 \\ S_7 \end{bmatrix} = \begin{bmatrix} C0 & C0 & C0 & C0 & C0 & C0 & C0 & C0 \\ C1 & C3 & C4 & C6 & -C6 & -C4 & -C3 & -C1 \\ C2 & C5 & -C5 & -C2 & -C2 & C5 & C5 & C2 \\ C3 & C6 & -C1 & -C4 & C4 & C1 & -C6 & -C3 \\ C0 & -C0 & -C0 & C0 & C0 & -C0 & -C0 & C0 \\ C4 & -C1 & -C6 & C3 & -C3 & -C6 & C1 & -C4 \\ C5 & -C2 & C2 & C5 & -C5 & C2 & -C2 & C5 \\ C6 & -C4 & C3 & -C1 & C1 & -C3 & C4 & -C6 \end{bmatrix} \begin{bmatrix} s0 \\ s1 \\ s2 \\ s3 \\ s4 \\ s5 \\ s6 \\ s7 \end{bmatrix} \quad (2)$$

where the constants C0 to C6 are approximately 0.35355, 0.49039, 0.46194, 0.41573, 0.27779, 0.19134, and 0.09755, respectively. The corresponding one-dimensional IDCT is given by:

$$s_x = \sum_{u=0}^{7} \frac{C(u)}{2} * S_u * \cos\left((2x+1)*u*\frac{\pi}{16}\right); \quad (3)$$

where u and x are integers between zero and seven, $S_u$ is one of the eight frequency components, $s_x$ is one of the corresponding eight image values, $$C(i) = \frac{1}{\sqrt{2}}$$

for i=0, and C(i)=1 for i=1 to 7. The IDCT can be calculated using the same matrix coefficients, however, the matrix described by equation (3) is the transpose of the matrix in equation (2). Thus, the IDCT is given by $$\begin{bmatrix} s0 \\ s1 \\ s2 \\ s3 \\ s4 \\ s5 \\ s6 \\ s7 \end{bmatrix} = \begin{bmatrix} C0 & C1 & C2 & C3 & C0 & C4 & C5 & C6 \\ C0 & C3 & C5 & C6 & -C0 & -C1 & -C2 & -C4 \\ C0 & C4 & -C5 & -C1 & -C0 & -C6 & C2 & C3 \\ C0 & C6 & -C2 & -C4 & C0 & C3 & C5 & -C1 \\ C0 & -C6 & -C2 & C4 & C0 & -C3 & -C5 & C1 \\ C0 & -C4 & C5 & C1 & -C0 & -C6 & C2 & -C3 \\ C0 & -C3 & C5 & -C6 & -C0 & C1 & -C2 & C4 \\ C0 & -C1 & C2 & -C3 & C0 & -C4 & C5 & -C6 \end{bmatrix} \begin{bmatrix} S_0 \\ S_1 \\ S_2 \\ S_3 \\ S_4 \\ S_5 \\ S_6 \\ S_7 \end{bmatrix} \quad (4)$$

The number of multiplications and additions required to calculate the FDCT and IDCT according to equations (2) and (4), respectively, can be reduced by exploiting the symmetries in the matrix coefficients. For example, from equation (2), $S_0$ can be expressed as $$S_0 = C0*(s_0+s_1+s_2+s_3+s_4+s_5+s_6+s_7) \quad (5)$$

thereby eliminating seven multiplications. From equation (3), $s_0$ can be expressed as $$s_0 = C0*(S_0+S_4)+C1*S1+C2*S_2+C3*S_3+C4*S_5+C5*S_6+C6*S_7 \quad (6)$$

thereby eliminating only one multiplication. The lack of "symmetry" between $S_0$ and $s_0$ evident from equations (5) and (6) is generally absent between $S_i$ and $s_x$. Thus, any previously known fast DCT modules that are capable of determining both the FDCT and the IDCT require significant additional logic circuitry in comparison to DCT modules which determine only the FDCT or the IDCT.

Referring to FIG. 1, a functional block diagram of a DCT module 30 for determining the FDCT and IDCT of a set of input values (e.g., grayscale values or spatial frequency values) according to equations (2) and (4), respectively, is shown. Each input value received at the DCT module input 32 is multiplied by a matrix coefficient in a coefficient multiplier module 38. For coefficients C0 to C6, a minimum of thirteen bits is required for compliance with the accuracy requirements of the JPEG standard. Thus, each coefficient is expressed in binary form by multiplying it by $2^{13}$ and truncating the non-integer portion of the result (e.g., 0.35355 is converted to the binary representation for 2896).

The multiplication performed in each multiplier module 38 is simplified by adding various shifted pre-computed multiples of the input value. The use of pre-computed multiples (i.e., Booth encoding) reduces the logic circuitry required for calculation of the FDCT and IDCT. For a thirteen bit implementation, a modified four-bit Booth encoding technique is employed. The only pre-computed multiples necessary for performing multiplication using the seven matrix coefficients are −3, 0 1, 3 and 7 times the input values. Thus, only two pre-multiplier modules 34a,34b which multiply the input by 3 and 7 are required. Multiplication by 1 is achieved by bypassing the pre-multiplier modules 34a,34b and providing the input value directly to the multiplier modules 38. Multiplication by −3 is achieved by first multiplying the input value by 3, complementing the result, and adding one.

Referring now to FIG. 2, the predetermined shifting and adding performed by each multiplier module is tabulated. The second column indicates the "raw" value of each of the seven matrix coefficients. The third and fourth columns indicate the corresponding integer values in base ten and binary representation, respectively, after multiplication by $2^{13}$. Other columns indicate how the binary input value is shifted and added to generate the product of the matrix coefficient and the input value.

Figure 3:
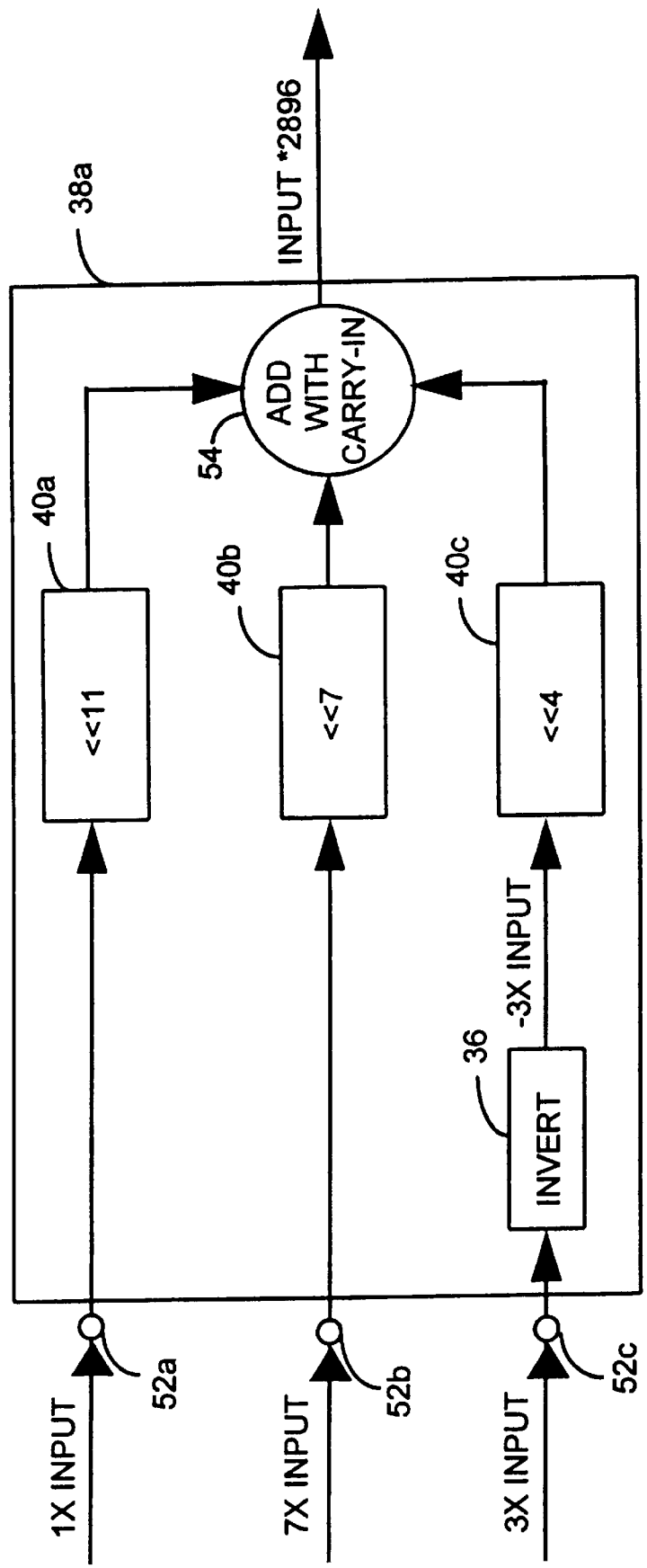
FIG. 3 is a functional block diagram of the C0 coefficient multiplier module of FIG. 1.

By way of example, the functional block diagram of FIG. 3 shows how the product $s_0 * C0$ is determined by the C0 multiplier module 38a. The direct input (i.e., not precomputed by any pre-multiplier module) for the first of the eight image values (i.e., s0) is provided to the first input 52a of the C0 multiplier module 38a. The times three precomputed multiple and the times seven pre-computed multiple generated by the pre-multiplier modules 34a,34b are also provided to the C0 multiplier 38a at its second input 52b and third input 52c. A negative three times value is calculated by inverting the three times input (i.e., complementing the three times input and adding one in inverter 36). The product of $s_0 * C0$ is generated by left-shifting the direct input value by eleven bits in a first shift register 40a, left-shifting the times seven output by seven bits in a second shift register 40b, and left-shifting the inverted three times input by four bits in a third shift register 40c. The three resulting binary partial products in the three shift registers 40a,40b,40c are added in adder 54 to generate the desired output value (i.e., $s_0 * 2896$). Other products provided by the other multiplier modules 38c to 38g are generated by shifting then adding three partial products as indicated in FIG. 2. Only the $s_1 * C0$ product requires combining four partial products and, therefore, requires a fourth shift register in its multiplier module 38b.

Other types of Booth encoding can be used with the present invention. For four-bit Booth encoding, the possible Booth digits are 1, 3, 5, and 7. A different set of Booth digits might be possible which can result in reduced logic circuitry. In addition, greater precision can be realized by scaling the constants by higher values (e.g., $2^{14}$ or greater), resulting in fewer single-bit errors in the DCT module output. This greater precision requires a different implementation of shifting and adding by the multiplier modules 38.

Referring again to FIG. 1, each multiplier module 38 provides its output product to each of eight multiplexers 42. When the first image value (i.e., $s_0$) is present at the DCT module input 32, each seven-to-one multiplexer 42 selects a predetermined output of one of the seven multiplier modules 38 and provides it to a corresponding combiner 44. The combiner includes a conditional negater 46 which, depending on the particular product received, changes the sign of the product value. The positive or negative product is then provided to an accumulator register 48. When the next image value (i.e., $s_1$) is received at the DCT module input 32, each multiplexer 42 again selects a predetermined output of one of the multiplier modules 38 and provides it to the corresponding combiner 44. The selected product is negatived by the conditional negater 46, if required, and provided to the accumulator register 48. This process is repeated until eight products have been provided to each accumulator register 48. The combination of the eight products is predetermined by the mathematical relationships defined in terms of the coefficients in equation (2). The sum of the products provided to each accumulator register 48 is available at the accumulator outputs 50. Thus, each accumulator output 50 represents one of the FDCT coefficients determined from the eight image values. When a new set of image values is provided to the DCT module input 32, the accumulator registers 48 are reset to zero and the process described above is repeated, yielding another set of FDCT coefficients.

By way of example, S1 (i.e., the second FDCT value) can be expressed as $$S1 = C1*s_0 + C3*s_1 + C4*s_2 + C6*s_3 - C6*s_4 - C4*s_5 - C3*s_6 - C1*s_7 \quad (7)$$

Thus, on the first cycle, the product from the C1 multiplier module 38b is provided to the accumulator 48b without change of sign. Similarly, on the second through fourth cycles, the products from the C3, C4 and C6 multiplier modules 38d, 38e, 38g, respectively, are provided to the accumulator 48b. On the fifth through eight cycles, products from the C6, C4, C3, and C1 multiplier modules 38g,38e, 38d,38b, respectively, are provided to the accumulator 48b after first being negatived by the conditional negater 46b. Thus, each contribution to the accumulator 48b corresponds to a unique term in equation (7) and the summation of all terms provides the desired value (e.g., S1) at the accumulator output 50b.

Because the same seven matrix coefficients used for determining the FDCT are also used in calculating the IDCT, the module 30 can provide the IDCT of frequency-space values without necessitating additional circuit elements. In this alternate mode, each multiplexer 42 selects a predetermined output of one of the seven multiplier modules 38 for the first frequency-space value (e.g., S0). Generally, the selected product is provided by a different multiplier module 38 than the product selected by the same multiplexer 42 in FDCT mode. This is due to the differences between corresponding components in the matrices of equations (2) and (4). The conditional negaters 46 and accumulator registers 48 perform the same functions as for the FDCT mode. After the eight cycle, each accumulator register 48 contains the combination of products corresponding to one of the IDCT output values.

Figure 4:
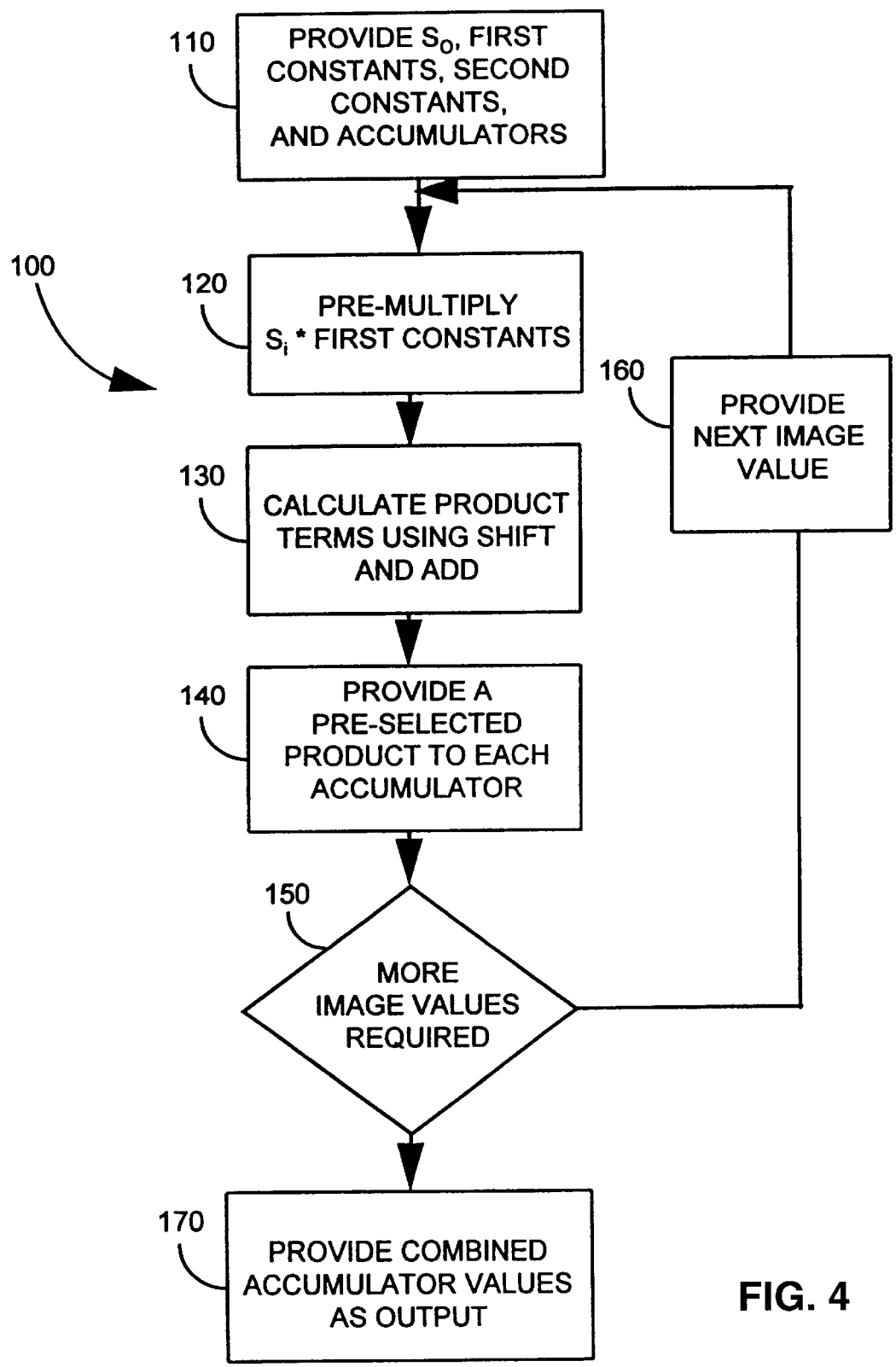
FIG. 4 is flowchart of a method using Booth encoding for calculation of a DCT according to the present invention.

Referring to the flowchart 100 in FIG. 4, one implementation of the method of the invention is described as a series of steps. In step 110, an image value (e.g., a pixel grayscale value), a first set of constants (e.g., values used for Booth encoding), a second set of constants (e.g., a set of binary numbers corresponding to matrix coefficients), and a set of accumulator registers 48 is provided. In step 120, the image value is multiplied by the first set of constants to generate a set of partial products.

In step 130, the partial products are used to calculate a set of product terms defined by multiplication of the image value with a second set of constants (e.g., matrix coefficients). Each product term is determined by shifting various partial products by various predetermined numbers of bits, and adding the results. In step 140, a preselected product term is assigned to each accumulator register 48. In step 150, if there are remaining image values required for determining the FDCT, the method includes providing the next image value in step 160. Alternatively, the method proceeds to step 170 where the values combined in each accumulator register 48 are provided as the FDCT output.

Equivalents

While the invention has been particularly shown and described with reference to specific preferred embodiments, it should be understood by those skilled in the art that various changes in form and detail may be made therein without departing from the spirit and scope of the invention as defined by the appended claims.

What is claimed is:

1. A method of image processing comprising the steps of:
    a) providing a first set of constants, a second set of constants, a set of accumulators, and a set of image values to be processed;
    b) multiplying each image value by each constant within the first set of constants to generate a set of partial products;
    c) calculating a set of products comprising the product of each image value with each constant within the second set of constants, the calculation of each product comprising shifting preselected partial products and adding a combination thereof;

d) providing to each accumulator a preselected product from the set of products for each image value; and e) generating as an output from each accumulator the combination of products within the accumulator.

2. The method of claim 1 wherein the set of image values represents a subimage of the image to be processed.

3. The method of claim 1 wherein the outputs of the set of the accumulators provide the discrete cosine transform of the set of image values.

4. The method of claim 1 wherein the set of image values represents spatial frequency information in an image to be processed.

5. The method of claim 1 wherein the outputs of the set of the accumulators provide the inverse discrete cosine transform of the set of image values.

6. The method of claim 1 wherein the first set of constants are binary numbers.

7. The method of claim 1 wherein the second set of constants are binary numbers.

8. The method of claim 1 wherein steps b) and c) comprise performing Booth encoding.

9. The method of claim 8 wherein the steps of performing Booth encoding further comprise performing a modified four-bit Booth encoding.

10. The method of claim 1 wherein the first set of constants comprises the values of 1, 3 and 7.

11. An apparatus for digital image processing, comprising:

an input for receiving a set of image values to be processed;

a first multiplier module for multiplying an image value at the input by each number within a first set of constants and having a set of outputs, each of the outputs of the first multiplier module providing the product of an image value and a number in the first set of constants;

a second multiplier module for multiplying an image value by each number within a second set of constants based on the products provided at the outputs of the first multiplier module, the second multiplier module having a set of outputs, each of the outputs of the second multiplier module providing the product of an image value and a number in the second set of constants, a set of multiplexers in communication with the outputs of the second multiplier modules, each multiplexer having an output providing a preselected product from one of the outputs of the second multiplier module; and a set of accumulators in communication with the set of multiplexers, each accumulator having an output for providing a combination of the products received by the accumulator.

12. The apparatus of claim 11 wherein the second multiplier module multiplies an image value by each number within the second set of constants based on a binary shift and combine operation utilizing the products provided at the outputs of the first multiplier module.

13. The apparatus of claim 11 wherein the set of image values represents a subimage of an image to be processed.

14. The apparatus of claim 11 wherein the outputs of the accumulators are the discrete cosine transform of the image values.

15. The apparatus of claim 11 wherein the set of image values represents spatial frequency information in an image to be processed.

16. The apparatus of claim 11 wherein the outputs of the accumulators are the inverse discrete cosine transform of the image values.

* * * * *